Figure 4:
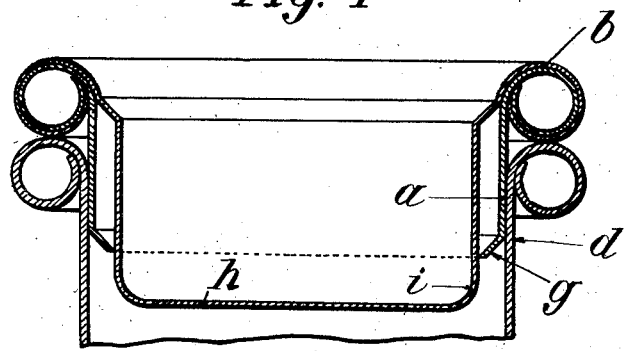

Feb. 2, 1926.
E. L. R. SALLES
1,571,605
MEANS FOR CLOSING RECEPTACLES
Filed July 16, 1921        3 Sheets-Sheet 1
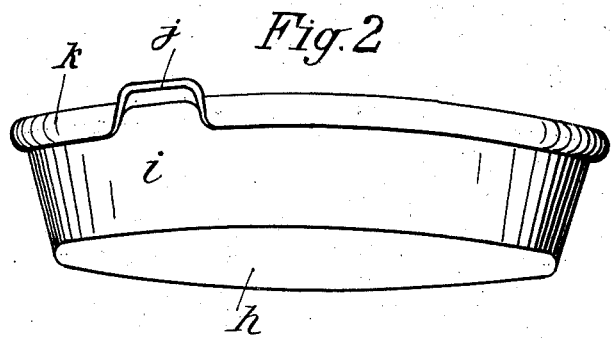
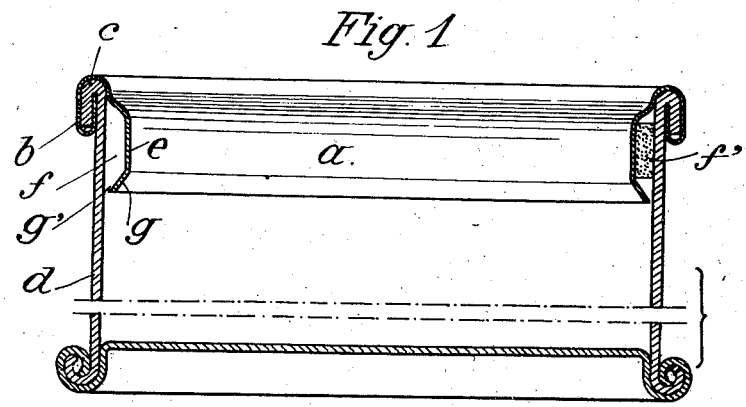
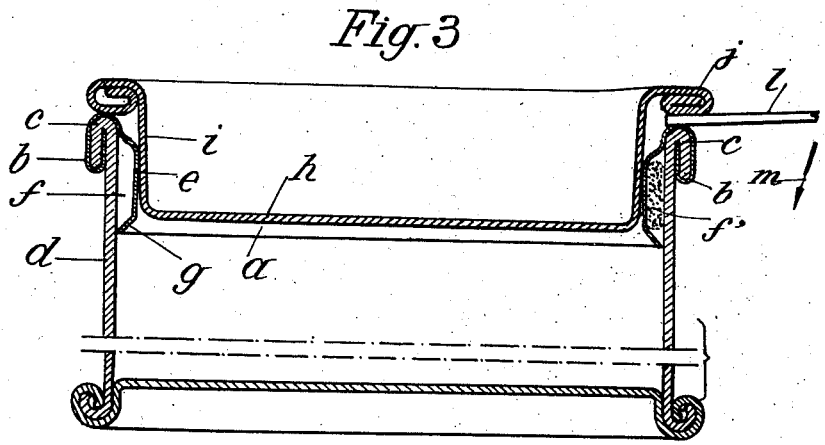
INVENTOR
Edmond Louis Romain Salles
BY Townsend & Decker
ATTORNEYS.

Feb. 2, 1926.
1,571,605

E. L. R. SALLES

MEANS FOR CLOSING RECEPTACLES

Filed July 16, 1921   3 Sheets-Sheet 3

INVENTOR
Edmond Louis Romain Salles
BY Townsend & Keehur
ATTORNEYS.

Patented Feb. 2, 1926.

1,571,605

UNITED STATES PATENT OFFICE.

EDMOND LOUIS ROMAIN SALLES, OF PARIS, FRANCE.

MEANS FOR CLOSING RECEPTACLES.

Application filed July 16, 1921. Serial No. 485,232.

*To all whom it may concern:*

Be it known that I, EDMOND LOUIS ROMAIN SALLES, a citizen of the Republic of France, and residing at Paris, France, 100 Boulevard Arago, manufacturer, have invented certain new and useful Improvements in Means for Closing Receptacles, of which the following is a specification.

This invention has for its object means for closing metal receptacles.

According to this invention, a ferrule is interposed between the wall of the receptacle and a lateral flange provided on the cover of the receptacle; one of the edges of the said ferrule is fixed either to the container or to the cover and the body of the ferrule is located at a certain distance apart from the receptacle whilst the other edge of the ferrule is bent towards the receptacle (if the first edge is fixed to the said receptacle) or towards the lateral flange of the cover (if the first edge is fixed to the cover); the said other edge touching, or nearly so, the wall of the flange to which it is fixed.

A tight joint between the ferrule and the other element of the closure is caused by inserting one into the other, the ferrule and the element (receptacle or cover) to which it is not fixed and which possesses, to this effect, such a diameter as to cause a tight contact between itself and the ferrule.

By this fitting of the two elements one into the other, the free edge of the ferrule is pressed against the wall of the receptacle or against the flange of the cover and the ferrule yields to some extent being supported against the former by the wall of the receptacle or the flange of the cover.

A container or receptacle closed according to this invention may be closed very tight and can be easily cleaned; it can also be manufactured in a very simple manner.

The ferrule is preferably jointless and formed of thin metal in order that it may apply itself better against the cover.

If desired, there may be arranged between the ferrule and the wall of the container or the flange of the cover, an elastic ring of rubber for example.

When the ferrule is fixed to the container, the said container may, if desired, be provided with a sheath at the joint of the container.

In order to secure a double closure, two ferrules are provided, one being arranged outside and the other inside either the container or the cover; or the container is provided with a ferrule and the cover with a ferrule both making separate joints.

Another modification consists in providing the container with two superposed lids.

When the cover is such that it can be pushed flush against the top of the container its opening is facilitated by providing the cover with a raised edge beneath which a key or a coin can be inserted.

The invention is illustrated in the accompanying drawings in which Fig. 1 is a diametral section of the upper portion of the container without its cover, Fig. 2 is a perspective view of the cover and Fig. 3 is a diametral section of the upper portion of the closed container. Figs. 4 to 10 are diametral sections of modifications of the invention.

As illustrated in Fig. 1, the closure is comprised of a ferrule $a$ whose upper edge is secured at $b$ to the edge $c$ of the container $d$. The body $e$ of the ferrule leaves a free space $f$ between it and the container $d$. The lower edge $g$ of the ferrule is free and is bent towards the wall $d$ which it merely touches or leaves a very small space $g'$ between it and the wall, being at such place unattached to said wall. Preferably and as shown the free edge is inclined with relation to the wall towards which it is bent.

Thus constructed the ferrule forms at the neck of the container an inner somewhat elastic collar.

The cover $h$ comprises a circular wall $i$ slightly conical as illustrated and of a size such that it can fit into the ferrule $a$ pressing well against it as shown in Fig. 3.

Closure takes place between the body $e$ of the ferrule and the wall $i$ of the cover.

The more elastic and thinner the ferrule, the better it is applied against the container. In order in this case to increase the closure pressure a ring of rubber or other elastic material may be placed inside the ferrule as indicated at $f'$ to the right of Fig. 1.

To the right of Fig. 3 and in Fig. 2 there will be seen at $j$ a deformation on the rolled edge $k$ of the cover; such deformation allows a key $l$ or a coin to be slid between the edge $c$ of the container and the deformation $j$. By moving the key $l$ in the direction of the arrow m or turning it upon itself the cover may be lifted.

Figure 5:
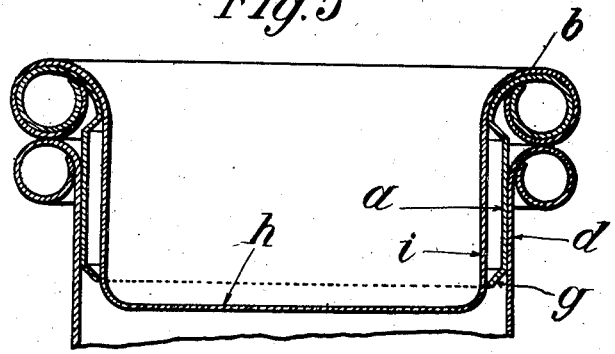
Figure 6:
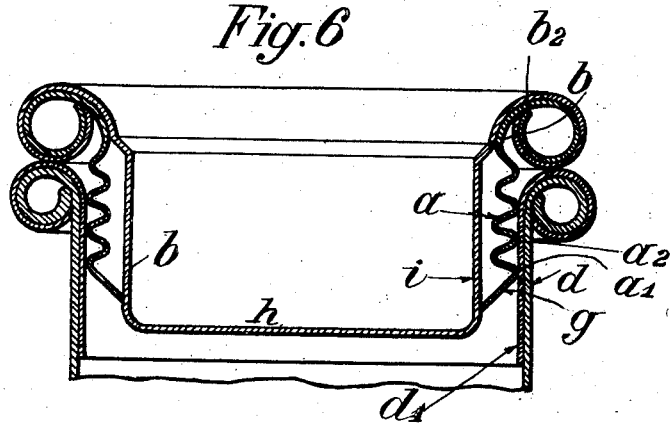

In Figs. 4 to 6, the ferrule a is arranged outside the cover h. Its upper edge b is fixed to the cover and its lower edge g is bent towards the wall i of the cover. Internally the top of the container d is smooth and the cover and ferrule fit into it.

In Fig. 6 the ferrule is corrugated and one or more projections a¹ a² etc., of the corrugations comes against the inner wall of the container and so forms a better joint. In this figure a sheath d' has been provided whose upper edge is secured to the edge of the container; the sheath forms a continuous and smooth joint surface in spite of solder or attachment to the container d.

Figure 7:
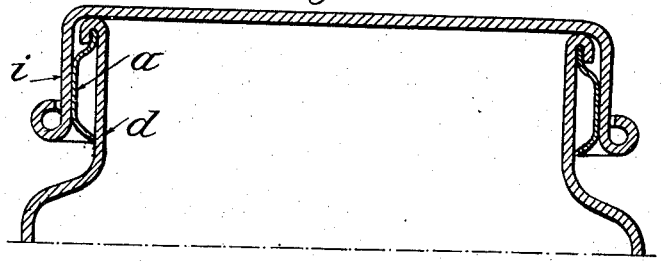

In Fig. 7 the ferrule is outside the container and the wall i of the cover passes outside it.

Figure 8:
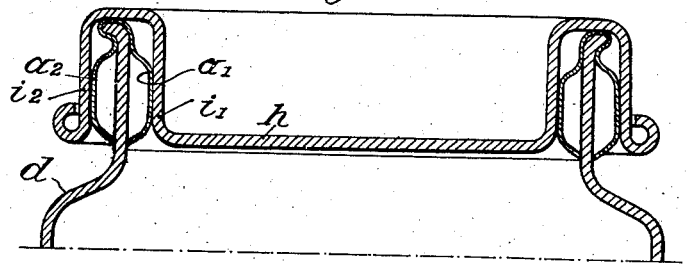

In Fig. 8 there are two ferrules, an inside ferrule a¹ and an outside ferrule a² both secured to the container d. The cover is provided with two fitting walls thus forming a double joint.

Figure 9:
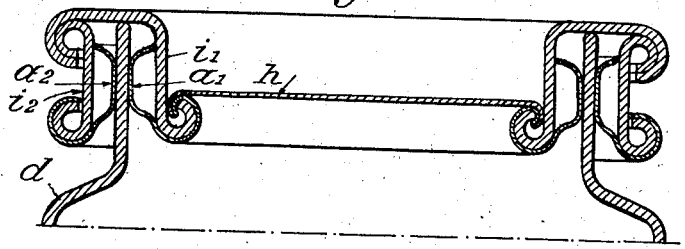

In Fig. 9 the two ferrules a¹ and a² are secured to the walls i¹ and i² of the cover.

Figure 10:
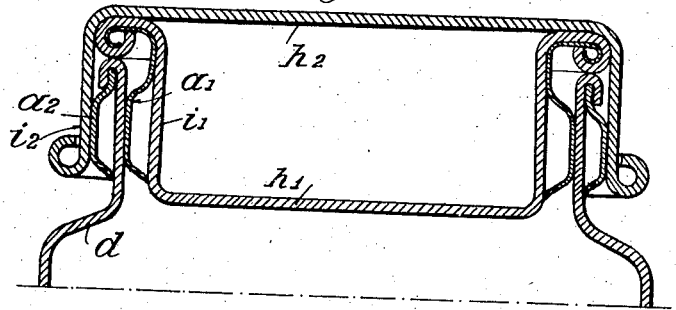

In Fig. 10 one ferrule a¹ is secured to an inner cover h¹ fitting into the container, the other ferrule a² being secured outside the container d, the wall i² of an outer cover h² fitting over the second ferrule.

No claim is made herein to the jointless sheath illustrated in Fig. 6 as this forms the subject of an application for patent filed by me as a division of the present application May 15, 1923, Serial No. 639,088.

No claim is herein made to the double ferrule employed in the manner illustrated in Figs. 8, 9 and 10 as this forms the subject of an application for patent filed by me as a division of the present application on the 15th of May 1923, Serial No. 639,087.

Claims—

1. Means for closing containers comprising two elements fitting one into the other when they are forced one into the other, a ferrule interposed between the two elements, the said ferrule being fixed by one of its edges on to one of the elements, and having its body substantially parallel to an engaging portion of the other element, and extending from the point of attachment out of contact with a wall of the element on to which it is fixed, the other edge of the ferrule being bent back towards but unattached to the wall of the element onto which it is fixed to permit a yielding action when the elements are fitted one into the other.

2. Means for closing containers comprising two elements fitting one into the other when they are forced one into the other, a ferrule interposed between the two elements, the said ferrule being fixed by one of its edges on to one of the elements, a free space between the ferrule and a wall of the element onto which it is fixed, the other edge of the ferrule being free and bent towards the wall of the element onto which it is fixed but inclined with relation to the surface of said element and being pressed towards said element when the container is closed.

3. Means for closing containers comprising two elements fitting one into the other when they are forced one into the other, a ferrule interposed between the two elements, the said ferrule being fixed by one of its edges on to one of the elements, a free space between the ferrule and the element onto which it is fixed, the other edge of the ferrule being bent towards the element onto which it is fixed and, between this latter edge of the ferrule and the element to which it is fixed, a very small gap which disappears when the two elements are forced one into the other.

4. Means for closing containers comprising two elements fitting one into the other when they are forced one into the other, a ferrule interposed between the two elements, the said ferrule being fixed by one of its edges on to one of the elements, a free space between the ferrule and the element onto which it is fixed, the other edge of the ferrule being bent towards the element onto which it is fixed and a ring of yielding material interposed into the free space provided between the ferrule and the element to which it is fixed.

5. Means for closing containers comprising two elements fitting one into the other when they are forced one into the other, a ferrule interposed between the two elements, the said ferrule being fixed by one of its edges on to one of the elements, and having its body substantially parallel to an engaging wall of the other element, the other edge of the ferrule being bent towards the element onto which it is fixed but unattached thereto, the wall of the element which does not carry the ferrule being tapered so as to ensure the forcing of the said element into the ferrule.

6. A metallic container, a ferrule fixed by its upper edge on to the edge of the said container, a free space between the body of the ferrule and the edge of the said container, a free lower edge of the ferrule bent towards the wall of the container but providing a small gap between the said bent edge and the said wall, a cover, a lateral flange provided on the said cover and capable of coming home into the ferrule and having such a diameter as to press the lower bent edge of the ferrule against the wall of the container when the flange of the cover is inserted into the said ferrule.

7. Means for closing receptacles comprising two elements fitting one into the other when they are forced one into the other, a ferrule interposed between the two elements, the said ferrule being fixed by one of its edges to one of the elements and having its body substantially parallel to an engaging portion of the other element, and leaving a small free space between its other end and the other element, the said other end coming into contact with the said other element when the two elements are forced one into the other.

In testimony whereof I have affixed my signature.

EDMOND LOUIS ROMAIN SALLES.